United States Patent Office 3,595,860
Patented July 27, 1971

3,595,860
PROCESS FOR PREPARING 4,4'-DIPHTHAL-
IMIDINYL STILBENE COMPOUNDS
George P. Rizzi, Springfield Township, Ohio, assignor to
The Procter & Gamble Company, Cincinnati, Ohio
No Drawing. Filed Apr. 16, 1969, Ser. No. 816,789
Int. Cl. C07d 27/50
U.S. Cl. 260—240
10 Claims

ABSTRACT OF THE DISCLOSURE

A process for preparing 4,4'-diphthalimidinyl stilbene compounds which comprises reacting a phthalide with a 4,4'-diaminostilbene in a molar ratio of phthalide to 4,4'-diaminostilbene of from 0.1:10 to 10:0.1 in the presence of a polyhydric alcohol of the formula

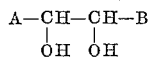

wherein each A and B is hydrogen or hydroxyalkyl of from 1 to 4 carbon atoms; and an aliphatic tertiary amine. The compounds are useful as optical brighteners, particularly in bleach-containing detergent compositions.

FIELD OF THE INVENTION

This invention relates to a process of preparing 4,4'-diphthalimidinyl stilbene compounds. More particularly, it relates to a process of preparing 4,4'-diphthalimidinyl stilbene compounds useful as bleach-stable optical brighteners by reaction of a phthalide with a 4,4'-diaminostilbene.

The preparation of phthalimidinyl derivatives by reaction of a phthalide or phthalaldehyde with simple amines such as methyl amine or aniline is well known. See, for example, C. Broquet and J. P. Genet, C. R. Acad. Sc. Paris, t 265, Series C, p. 117 (1967) and Yakugaku Zasshi 85 (12), 1042–49 (1965). Attempts to prepare the corresponding diphthalimidinyl stilbene derivatives by reaction of a phthalide and a 4,4'-diaminostilbene according to known methods have, however, been characterized by low yields of undesirably charred and impure product. Moreover, the product is difficult to separate and purify. While the precise reasons for the difficulty in obtaining 4,4'-diphthalimidinyl stilbene derivatives in desirable yield is not completely understood, it is believed that the low solubility of 4,4'-diaminostilbenes and phthalides in mutual solvents and the difficulty in achieving a homogeneous reaction mixture are contributing factors.

It is an object of the present invention to provide 4,4'-diphthalimidinyl stilbene compounds by reaction of a phthalide and a 4,4'-diaminostilbene.

It is another object of the present invention to provide 4,4'-diphthalimidinyl stilbene compounds in high yield and free of undesirable discoloration.

Other objects of the present invention will become apparent from consideration of the invention as hereinafter described.

SUMMARY OF THE INVENTION

This invention is based on the discovery that 4,4'-diphthalimidinyl stilbene compounds are obtained in high yield by reacting a phthalide and a 4,4'-diaminostilbene in the presence of a polyhydric alcohol and an aliphatic tertiary amine. The invention thus involves a process for preparing desirable yields of 4,4'-diphthalimidinyl stilbene compounds useful as optical brighteners.

DETAILED DESCRIPTION OF THE INVENTION

The 4,4'-diphthalimidinyl stilbene compounds of the present invention are prepared by reaction of a phthalide and a fluorescent 4,4'-diaminostilbene according to the following scheme:

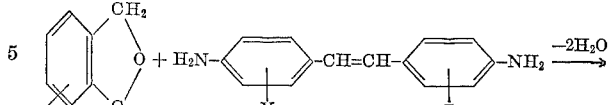

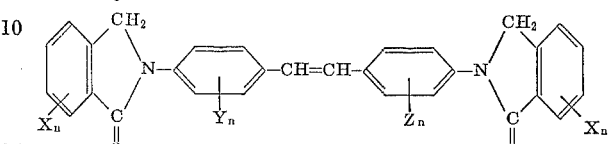

wherein X is H; halogen (e.g., chlorine, fluorine); acetamido

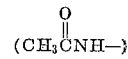

lower alkyl (e.g., methyl, ethyl, n-propyl, isobutyl, hexyl, 2-ethylhexyl); lower alkoxy (e.g., methoxy, ethoxy, isopropyloxy, n-octyloxy); each Y and each Z is H; lower alkyl; $-SO_3M$ where M is alkali metal (e.g., sodium, potassium, lithium), ammonium or substituted-ammonium;

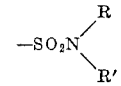

where R and R' are hydrogen, lower alkyl,

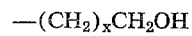

where $x$ is an integer of from 1 to 5 or together comprise a cyclic structure (e.g., pyridyl, morpholino); and each $n$ is an integer of from 1 to 4. Lower alkyl and lower alkoxy are employed herein to refer to alkyl and alkoxy of from 1 to 8 carbon atoms.

The phthalides useful herein in the preparation of 4,4'-diphthalimidinyl stilbene brighteners are known compounds and include phthalide and substituted derivatives thereof wherein the substituents conform to the formula hereinbefore described. The compounds include 4-methoxyphthalide,
6-methoxyphthalide,
6-chlorophthalide,
6-fluorophthalide,
6-acetamidophthalide,
5,6-dimethoxyphthalide,
4,5,6,7-tetramethylphthalide,
4-chloro-5,6-dibutylphthalide,
4,5,6-trifluorophthalide, and the like.

These substituents are stable under the reaction conditions defined hereinafter and do not preferentially react with the 4,4'-diaminostilbene employed herein. The preferred phthalide reactant is phthalide, preferred by reason of its facility in undergoing the reaction of the present invention and its ready availability.

The amines which can be employed to prepare the 4,4'-diphthalimidinyl stilbene compounds of the present invention are the 4,4'-diaminostilbenes. These amines are conventional brightener chromophores known to those skilled in the art and are aromatic diamines characterized by ultraviolet absorption in the range of 325 to 400 nm. and fluorescence in the 400 to 475 nm. range. Examples of 4,4'-diaminostilbenes useful herein include 4,4'-diaminostilbenes and the substituted derivatives thereof wherein the substituents are as defined in the hereinbefore described formula. These compounds include 4,4'-diaminostilbene, disodium 4,4' - diamino-2,2'-stilbenedisulfonate, dipotassium 4,4' - diamino-2,2'-stilbenedisulfonate, diammonium 4,4' - diamino - 2,2' - stilbenedisulfonate, 4,4'-diamino-2,2' - stilbenedisulfonamide, 4,4' - diamino - 2,2'-[N,N-diethylsulfonamido]-stilbene, disodium 4,4'-diamino-3,3'-dimethyl - 2,2' - stilbenedisulfonate, lithium 4,4' - diamino - 3,5 - dichloro - 2' - stilbenesulfonate, potassium 4,4' - diamino - 2,3,5,6 - tetrachloro-5,6-dimethyl-2'-stilbenesulfonate, 4,4' - diamino - 2,2'-[N,N-pentamethylenesulfonamido]-stilbene, and the like.

Preferred herein are the alkali metal, e.g., sodium and potassium, salts of 4,4' - diamino-2,2'-stilbenedisulfonic acid and 4,4' - diamino-2,2'-stilbenedisulfonamide. These compounds are preferred from the standpoint of facility of reaction, formation of bleach-stable, fabric-substantive, optical brighteners and ready availability.

The 4,4'-diaminostilbenes employed herein are characterized by low solubility in the phthalides hereinbefore described. These amines tend to prevent the formation of a homogeneous reaction mixture by remaining in a substantially undissolved state in a melt of phthalide reactant thereby tending to lower the yields of the desired reaction product. It has been found quite unexpectedly that the employment of polyhydric alcohol as a solvent or reaction medium during reaction substantially improves the yield and purity of 4,4' - diphthalimidinyl stilbene compound without adverse formation of polymeric substances by reaction of the phthalide reactant with the polyhydric alcohol. It has been found that the employment of a vicinal polyhydric alcohol and an aliphatic tertiary amine in the reaction of a phthalide with a 4,4'-diaminostilbene permits the attainment of excellent yields of the desired 4,4'-diphthalimidinyl stilbene compounds. These yields ranging from up to 50% to 90% are in marked contrast to those obtained in the absence of the vicinal polyhydric alcohol and/or aliphatic tertiary amine catalyst. By "yield," as the term is herein employed, is meant the molar percent of desired 4,4' - diphthalimidinyl stilbene compound obtained by reaction of a phthalide and a 4,4'-diaminostilbene based on that theoretically obtainable. While the precise mechanism by which the polyhydric alcohol and aliphatic tertiary amine function to improve enhanced yields is not completely understood, it is believed that the tendency of the alcohols employed herein to solubilize and thereby render homogeneous the reaction mixture of phthalide and aminostilbene is involved.

The polyhydric alcohols useful herein are vicinal alcohols corresponding to the general formula

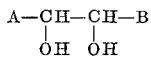

wherein each A and B is hydrogen or hydroxyalkyl of from 1 to 4 carbon atoms. These polyhydric alcohols characterized by the presence of hydroxy groups on adjacent carbon atoms facilitate the preparation of a homogeneous reaction mixture. Surprisingly, they are inert to the phthalide and 4,4'-diaminostilbene reactants, enhance the purity and yield of desired product and aid materially the separation of desired 4,4'-diphthalimidinyl stilbene compound by minimizing the amount of pyrolysis by-product formation.

It has been found that certain conventional inert organic solvents permit the attainment of a homogeneous reaction mixture but fail to provide the acceptable yields of desired 4,4' - diphthalimidinyl stilbene derivatives obtained by the process of the invention. Conventional solvents including dimethylsulfoxide, dimethylformamide, and hexamethylphosphoramide are examples of such solvents which provide either no product or a very low yield thereof. Similarly, 2,3-butanediol facilitates the formation of a homogeneous reaction mixture but provides a low yield of desired product.

Examples of polyhydric alcohols useful herein include ethylene glycol, glycerol, erythritol, 1,3,4,6-tetrahydroxyhexane and the like. Preferred solvents include ethylene glycol and glycerol which enhance yields of the desired 4,4' - diphthalimidinyl stilbene brighteners. Especially preferred is ethylene glycol which enables the preparation of the desired diphthalimidinyl derivatives in excellent yield and free of objectionable color or impurity.

The reaction of phthalide and 4,4'-diaminostilbene is carried out at a temperature in the range of from 200° C. to 250° C. If a temperature in excess of 250° C. is employed the resulting product is severely charred and is difficult to purify. Temperatures below 200° C. require an inordinately long period of time to produce the desired reaction product. A preferred temperature range is from 230° C. to 245° C. and provides the desired 4,4'-diphthalimidinyl stilbene compounds of the invention in a period of time of from 0.1 to 50 hours. The pressure will generally range from the autogenic pressure generated by the reaction mixture to 5000 p.s.i.g., depending upon the reaction temperature, the particular reactant employed and the like. Preferably, the pressure ranges from 500 p.s.i.g. to 1,000 p.s.i.g. It is preferred to conduct the process of this invention in an inert atmosphere which minimizes the tendency of atmospheric oxygen to react with the 4,4'-diaminostilbene reactant. Reaction in the presence of a nitrogen, argon or helium atmosphere is especially suitable.

The process of the present invention is carried out by reacting the hereinbefore described phthalide and 4,4'-diaminostilbene in a ratio respectively from 0.1:10 to 10:0.1. Preferably the ratio ranges from 5:1 to 2:1, the latter range facilitating the separation of the desired diphthalimidinyl stilbene compound.

The reaction can be conducted either batchwise or continuous. The constituents in the reaction mixture can be introduced independently into the reaction zone or the various constituents can be premixed and introduced into the reaction zone as a mixture or mixtures.

The amount of polyhydric alcohol employed herein is an amount sufficient to result in the formation of a homogeneous reaction mixture of the polyhydric alcohol, the phthalide and the 4,4'-diaminostilbene. A suitable amount of polyhydric alcohol is an amount based on the weight of the 4,4'-diaminostilbene of from 0.05 to 100 parts. A preferred amount is from about 0.1 to 10 parts of the polyhydric alcohol per part of 4,4'-diaminostilbene.

The process of the present invention is carried out in the presence of an aliphatic tertiary amine. This amine is an essential component of the reaction mixture employed herein and is an aliphatic tertiary amine having from 3 to 30 carbon atoms. The tertiary amine catalyst is employed in an amount of from 0.001 to 1, and preferably 0.005 to 0.5 part by weight of the 4,4'-diaminostilbene employed herein.

As used herein the term aliphatic is intended as including the cycloaliphatic, e.g., cycloalkyl, and a straight- and branch-chain, e.g., alkyl, alkenyl and alkynyl groups. Examples of suitable amines herein are trimethylamine, triethylamine, tri-n-butylamine, tri-tert-butylamine, tri-n-pentylamine, tri - 2 - ethylhexylamine, dimethyldodecylamine, dimethyl-2-ethylhexylamine, N,N-dimethylcyclohexylamine, dimethyl-2-butenylamine, tri-2-hexenylamine, dimethylpropargylamine, dibutyl-3-hexynyl amine, 2-butenylmethylpropargylamine, N,N-dimethylgeranylamine, N-methyl-piperidine, N-ethyl-pyrrolidine, N,N-dimethyl-piperazine, diazabicyclo-octane, and the like. Preferred herein are the tertiary alkylamines of from 3 to 18 carbon atoms. These tertiary amines facilitate the preparation of diphthalimidinyl compounds in substantial yield and in high purity and are readily available.

The process of the present invention enables the preparation of 4,4'-diphthalimidinyl stilbene brighteners in a yield of up to 90% based on the theoretical stoichiometric amount. The amount of desired 4,4'-diphthalimidinyl stilbene brighteners obtained by the process of the invention are in marked contrast to those obtainable by reaction of a phthalide and a 4,4'-diaminostilbene reacted in the absence of polyhydric alcohol and an aliphatic tertiary amine catalyst. Reactions conducted in the absence of a solvent and/or catalyst as hereinbefore defined, result in the formation of the desired product in an amount ranging from a trace amount to about 10%. Separation and purification are difficult as the product forms in the presence of a charred reaction mass. The process of the invention enables the preparation of 4,4'-diphthalimidinyl derivatives which can be separated from reaction mixtures by conventional methods.

The 4,4'-diphthalimidinyl stilbene compounds of the present invention can be separated from the reaction mixture by known methods. For example, the reaction product can be triturated with ethanol and filtered to yield the desired diphthalimidinyl stilbene derivatives. This results in the separation of pyrolysis products and 4-amino-4'-phthalimidinyl stilbene by-products from the desired diphthalimidinyl stilbene compound. The product can be purified further by conventional methods, e.g., by crystallization or by solvent leaching of impurities from the desired product. A suitable method comprises suspending the desired diphthalimidinyl product in a 1:1 by volume mixture of ethanol and water, cooling and filtering.

Examples of 4,4'-diphthalimidinyl stilbene compounds which can be prepared in accordance with the process of this invention include disodium 4,4'-diphthalimidinyl-2,2'-stilbenedisulfonate;
4,4'-diphthalimidinylstilbene;
disodium 4,4'-bis(6-methoxyphthalimidinyl)-2,2'-stilbenedisulfonate;
4,4'-bis(5,6-dichlorophthalimidinyl)stilbene;
potassium 4,4'-bis(4,5,6-trimethoxyphthalimidinyl)-2-methyl-2'-stilbenesulfonate;
di-tetraethylammonium 4,4'-bis(6-fluorophthalimidinyl)-2,2'-stilbenedisulfonate; and
4,4'-diphthalimidinyl-2,2'-dichloro-5,5'-sulfonamido stilbene.

The 4,4'-diphthalimidinyl stilbene compounds prepared by the process of this invention have utility as optical brighteners for textile materials and find wide application in the formulation of detergent compositions. The compounds prepared by the process of this invention are particularly suited, by virtue of their stability to bleaching compounds, to use in aqueous and granular bleach-containing compositions.

The following specific examples are presented to illustrate the objects and advantages of the invention of employing a polyhydric alcohol and aliphatic tertiary amine in the reaction of a phthalide with a 4,4'-diaminostilbene, but should not be construed to unduly limit the invention.

EXAMPLE I

A mixture of 50 parts disodium trans-4,4'-disodium-2,2'-stilbenedisulfonate trihydrate (1.07 moles), 33 parts phthalide (2.46 moles), 0.9 part triethylamine (0.0089 mole), and 25 parts ethylene glycol (0.4 mole) was heated to 235° C. and reacted for a period of four hours in a stainless steel 300-ml. autoclave. The reaction was conducted in a nitrogen atmosphere at 1,000 p.s.i.g. with agitation of the autoclave. The resulting reaction product was triturated with 1000 parts of 95% ethanol and filtered to yield 60 parts of disodium trans-4,4'-diphthalimidinyl-2,2'-stilbenedisulfonate tetrahydrate (80% yield). The resulting product was purified further by suspending the product in 10 parts of a 1:1 by volume mixture of 95% ethanol and water at 70° C. The mixture was cooled to 25° C. and filtered to yield about 60% of purified disodium trans-4,4'-diphthalimidinyl-2,2'-stilbenedisulfonate tetrahydrate. The product, a light yellow, crystalline solid was analyzed (two determinations) with the following results:

Calculated for $C_{30}H_{20}N_2O_8S_2Na_2 \cdot 4H_2O$ (percent): C, 50.2; H, 3.9; N, 3.9. Found (percent): C, 49.3, 49.1; H, 3.6, 3.4; N, 3.4, 3.4.

Infrared spectra (IR) indicated carbonyl absorption at 5.97μ; aromatic absorption at 6.25μ and 6.67μ; and sulfonate absorption at 8.35μ and 9.70μ. Nuclear magnetic resonance spectra (NMR) indicated methylene singlet at 4.9τ and an aromatic multiplet from 1.6τ to 2.9τ. The ultraviolet spectrum (IV) exhibited a maximum absorption at 349 nm. (ε=47,700) in $H_2O$.

Similar results were obtained when the dipotassium trans-4,4'-diamino-2,2'-stilbenedisulfonate was employed in place of disodium trans-4,4'-diamino-2,2'-stilbenedisulfonate under similar conditions in that dipotassium trans - 4,4' - diphthalimidinyl-2,2'-stilbenedisulfonate was obtained.

Similar results were obtained when the phthalide of Example I was replaced with 6-methoxyphthalide, 6-chlorophthalide, 6-fluorophthalide, 6-acetamidophthalide, and 4-methoxyphthalide, in that the following compounds were obtained: disodium trans-4,4'-bis(6-methoxyphthalimidinyl)-2,2'-stilbenedisulfonate; disodium trans-4,4'-bis(6-chlorophthalimidinyl)-2,2'-stilbenedisulfonate, disodium trans-4,4'-bis(6-fluorophthalimidinyl)-2,2'-stilbenedisulfonate.

EXAMPLE II

A mixture of 2.5 parts of disodium trans-4,4'-diamino-2,2'-stilbenedisulfonate trihydrate (0.0053 mole), 1.66 parts of phthalide (0.0124 mole), 0.072 part of dimethyldodecylamine (0.00034 mole) and 1.25 parts of dry glycerol (0.0136 mole) was heated in a 100-ml. round bottom flask for two hours at 235° C. under an inert atmosphere of nitrogen at 1 atmosphere pressure. The reaction product was cooled to 25° C. and 100 parts of 95% ethanol was added. The product obtained upon filtering was warmed in 5 parts of a 1:1 by volume ethanol water mixture. Cooling and filtering resulted in the preparation of 0.55 part of an analytically pure sample of disodium trans-4,4'-diphthalimidinyl-2,2'-stilbenedisulfonate trihydrate.

Similar results can be obtained when the glycerol of Example II is replaced by the following polyhydric alcohols in that a homogeneous reaction mixture is obtained and the desired disodium trans-4,4'-diphthalimidinyl-2,2'-stilbenedisulfonate is obtained: erythritol; 1,3,4-butanetriol; ethylene glycol; and 1,2,4-butanetriol.

Similar results can be obtained when the disodium trans-4,4'-diamino-2,2'-stilbenedisulfonate of Example II is replaced by the following 4,4'-diaminostilbenes in that the corresponding 4,4'-diphthalimidinyl-2,2'-stilbenes, i.e., dipotassium 4,4' - bis(6 - methoxyphthalimidinyl)-5,5'-dichloro-2,2'-stilbenedisulfonate and lithium 4,4'-bis(5,6-dichlorophthalimidinyl)5-methyl-5'-stilbenesulfonate are obtained: dipotassium 4,4'-diamino-5,5'-dichloro-3,3'-stilbenedisulfonate and lithium 4,4'-diamino-5-methyl-5'-stilbenesulfonate.

EXAMPLE III

A mixture of 0.253 part disodium trans-4,4'-diamino-2,2'-stilbenedisulfonate trihydrate (0.00054 mole), 0.264 part phthalide (0.00197 mole), 0.022 part dimethyldodecylamine (0.00010 mole), and 2.0 parts ethylene glycol (0.032 mole) was heated to 235° C. and reacted for a period of 15.5 hours in a sealed glass tube. The resulting reaction product was triturated with ca. 100 parts of 95% ethanol and filtered to yield 0.100 part of a yellow crystalline product. Infrared analysis showed the crystalline product to be disodium trans-4,4'-diphthalimidinyl-2,2'-stilbenedisulfonate trihydrate (26% yield).

Similar results can be obtained when the phthalide of Example III is replaced with 6-methoxyphthalide, 6-chlorophthalide, 6-fluorophthalide, 6-acetamidophthalide, and 4-methoxyphthalide, in that the following compounds are obtained in good yield: disodium trans-4,4'-bis(6-methoxyphthalimidinyl)-2,2'-stilbenedisulfonate; and disodium trans-4,4'-bis(6-fluorophthalimidinyl)-2,2'-stilbenedisulfonate.

Similar results can be obtained when the following amine catalysts are employed in place of the dimethyldodecyl amine of Example III in that the disodium trans-4,4'-diphthalimidinyl-2,2'-stilbenedisulfonate is obtained in good yield: triethylamine, N-methylpiperidine, triamylamine and triisobutylamine.

EXAMPLE IV

A mixture of 0.25 part disodium trans-4,4'-diamino-2,2'-stilbenedisulfonate trihydrate (0.0006 mole), 0.278 part phthalide (0.0021 mole), 0.009 part triethylamine, and 0.25 part ethylene glycol was heated at 235° C. for a period of 16 hours in a sealed 5 ml. round-bottomed Pyrex flask placed into a heated mineral oil bath. The reaction was conducted under the autogenic pressure of the reactants in the sealed flask. The reaction product was cooled to room temperature and the resulting reaction product was triturated with 25 parts of 95% ethanol and filtered to yield 0.281 part (72% yield) of a light-yellow, crystalline solid. Infrared analysis indicated that the product was disodium trans-4,4'-diphthalimidinyl-2,2'-stilbenedisulfonate.

A control run was conducted under the same conditions as Example IV except that 0.259 part (0.00055 mole) disodium 4,4'-diamino-2,2'-stilbenedisulfonate, 0.262 part (0.00196 mole) phthalide and 15.5 hours heating were employed. No triethylamine catalyst was employed. The product obtained after cooling of the flask to room temperature was a dark, charred, water-soluble non-fluorescent product. Thin-layer chromatographic analysis showed that only a trace of the desired disodium 4,4'-diphthalimidinyl-2,2'-stilbenedisulfonate had been formed.

EXAMPLE V

Employing the procedure and apparatus of Example IV, 0.227 part (0.00055 mole) of disodium 4,4'-diamino-2,2'-stilbenedisulfonate, 0.218 part (0.0016 mole) of phthalide, 0.009 part triethylamine and 2 parts ethylene glycol were heated for 16 hours at 235° C. The product was triturated in 25 parts of 95% ethanol and filtered yielding 0.114 part (33% yield) of a light-yellow, crystalline solid identified as disodium 4,4'-diphthalimidinyl-2,2'-stilbenedisulfonate.

A control run was conducted under the same conditions as Example V except that 0.235 part (0.0056 mole) of disodium 4,4'-diamino-2,2'-stilbenedisulfonate, 0.219 part (0.0016 mole) phthalide, 0.009 part triethylamine and 2 parts triethylene glycol were heated at 235° C. for 16.5 hours. The triturated and filtered product was not indicated by thin-layer chromatographic analysis to be the desired disodium 4,4'-diphthalimidinyl-2,2'-stilbenedisulfonate.

An additional control run was conducted by heating a 2:1 molar mixture of phthalide and 4,4'-diamino-2,2'-stilbenedisulfonate according to the procedure of Example V except that no solvent and no amine catalyst were employed. The reaction mixture was heated for two hours at a temperature of 300° C. The resulting product, a dark mass, was triturated in 95% ethanol and filtered. Thin-layer chromatographic analysis of the resulting product indicated the trace formation of disodium 4,4'-diphthalimidinyl-2,2'-stilbenedisulfonate.

What is claimed is:

1. A process for preparing 4,4'-diphthalimidinyl stilbene compounds which comprises reacting a phthalide of the formula

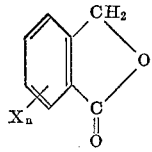

wherein X is selected from the group consisting of hydrogen; lower alkyl; lower alkoxy; halogen; and acetamido; and $n$ is an integer of from 1 to 4 with a 4,4'-diaminostilbene of the formula

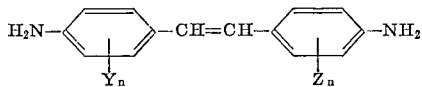

wherein each Y and each Z is selected from the group consisting of hydrogen; lower alkyl; —$SO_3M$ where M is alkali metal, ammonium or substituted-ammonium;

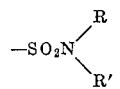

where R and R' are hydrogen, lower alkyl,

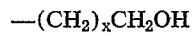

where $x$ is an integer of from 1 to 5 or R and R' together comprise a cyclic structure; and each $n$ is an integer of from 1 to 4; said reaction being conducted in the presence of a polyhydric alcohol of the formula

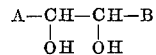

wherein each A and B is hydrogen or hydroxyalkyl of from 1 to 4 carbon atoms; and an aliphatic tertiary amine.

2. The process of claim 1 wherein the molar ratio of phthalide to 4,4'-diaminostilbene is from 0.1:10 to 10:0.1.

3. The process of claim 2 wherein the molar ratio of phthalide to 4,4'-diaminostilbene is from 5:1 to 2:1 and the reaction temperature is from 200° C. to 250° C.

4. The process of claim 3 wherein the polyhydric alcohol is employed in an amount sufficient to provide a homogeneous reaction mixture.

5. The process of claim 4 wherein the amount of polyhydric alcohol employed is from 0.05 to 100 parts by weight of the 4,4-diaminostilbene.

6. The process of claim 5 wherein the amount of polyhydric alcohol employed is from 0.1 to 10 parts by weight of the 4,4'-diaminostilbene.

7. The process of claim 6 wherein the tertiary amine is a tertiary alkylamine having from 3 to 18 carbon atoms and is employed in an amount of from 0.001 to 1 part by weight of the 4,4'-diaminostilbene.

8. The process of claim 7 wherein the 4,4'-diaminostilbene is an alkali metal 4,4'-diamino-2,2'-stilbenedisulfonate and the polyhydric alcohol is selected from the group consisting of ethylene glycol and glycerol.

9. The process of claim 8 wherein the tertiary alkylamine is selected from the group consisting of triethylamine and dodecyldimethylamine and is employed in an amount of 0.005 to 0.5 part by weight of the 4,4'-diaminostilbene.

10. The process of claim 9 wheerin the reaction is conducted in a nitrogen atmosphere at a temperature of from 230° C. to 245° C. and the pressure ranges from 500 p.s.i.g. to 1000 p.s.i.g.

References Cited

Bikkulov: Khim. i Tekhnol, Topliv i Masel 11(2), 10–13 (1966); C.A. 65:3070d.

HENRY R. JILES, Primary Examiner

G. T. TODD, Assistant Examiner

U.S. Cl. X.R.

252—117, 301.2

PO-1050
(5/69)

UNITED STATES PATENT OFFICE
CERTIFICATE OF CORRECTION

Patent No. 3,595,860  Dated July 27, 1971

Inventor(s) George P. Rizzi

It is certified that error appears in the above-identified patent and that said Letters Patent are hereby corrected as shown below:

Column 5, line 51, "disodium" in the second instance should be -- diamino --.

Signed and sealed this 4th day of January 1972.

(SEAL)
Attest:

EDWARD M. FLETCHER, JR.　　　　　　ROBERT GOTTSCHALK
Attesting Officer　　　　　　　　　　Acting Commissioner of Patents